US010011287B2

(12) United States Patent
Ma et al.

(10) Patent No.: US 10,011,287 B2
(45) Date of Patent: Jul. 3, 2018

(54) BOGIE FOR HIGH-SPEED RAILWAY VEHICLE (71) Applicant: CRRC QINGDAO SIFANG CO., LTD., Qingdao, Shandong (CN)

(72) Inventors: Lijun Ma, Shandong (CN); Zhenxian Zhang, Shandong (CN); Pingyu Zhou, Shandong (CN); Sansan Ding, Shandong (CN); Zhiguo Cui, Shandong (CN); Guoping Zhang, Shandong (CN)

(73) Assignee: CRRC QINGDAO SIFANG CO., LTD., Qingdao, Shandong (CN)

( * ) Notice: Subject to any disclaimer, the term of this patent is extended or adjusted under 35 U.S.C. 154(b) by 273 days.

(21) Appl. No.: 15/106,274

(22) PCT Filed: Nov. 13, 2015

(86) PCT No.: PCT/CN2015/094559
§ 371 (c)(1),
(2) Date: Jun. 17, 2016

(87) PCT Pub. No.: WO2016/124023
PCT Pub. Date: Aug. 11, 2016

(65) Prior Publication Data
US 2016/0362120 A1    Dec. 15, 2016

(30) Foreign Application Priority Data

Feb. 5, 2015   (CN) .......................... 2015 1 0061590
Feb. 5, 2015   (CN) .................... 2015 2 0083974 U (51) Int. Cl.
*B61F 9/00*    (2006.01)
*B61F 5/24*    (2006.01)
(Continued)

(52) U.S. Cl.
CPC ................ *B61F 9/00* (2013.01); *B60T 7/124* (2013.01); *B61F 1/14* (2013.01); *B61F 3/04* (2013.01);
(Continued)

(58) Field of Classification Search
CPC ...... B61F 9/00; B61F 1/14; B61F 3/04; B61F 5/04; B61F 5/10; B61F 5/24; B61F 5/30; B61F 5/52; B60T 7/124; B61H 5/00
See application file for complete search history.

(56) References Cited

U.S. PATENT DOCUMENTS 3,884,157 A * 5/1975 Pelabon .................... B61F 3/08
                                                      105/182.1
4,173,933 A * 11/1979 Kayserling ............. B61F 5/148
                                                      105/182.1
(Continued)

FOREIGN PATENT DOCUMENTS

CN    201198319 Y    2/2009
CN    201427587 Y    3/2010
(Continued)

OTHER PUBLICATIONS

International Search Report for PCT/CN2015/094559, dated Feb. 18, 2016, ISA/CN.
Chinese office action for CN201510061590.3, dated Jul. 19, 2016.

Primary Examiner — Jason C Smith
(74) Attorney, Agent, or Firm — U.S. Fairsky LLP; Yue Xu (57) ABSTRACT A bogie for a high-speed railway vehicle includes a wheel set, an axle box, a primary spring suspension device, a frame, a secondary spring suspension device and a foundation braking device. A wheel of the wheel set has an LMA wheel tread. The foundation braking device is mounted by a three-point hitch structure. The axle box is a structure which is separatable in a vertical direction, and an off-line safety (Continued)

protecting device is mounted at a lower portion of the axle box. A traction rod of the secondary spring suspension device is a single traction rod. A center pin is provided with an integral hoisting device. Two anti-yaw dampers, as a group, are arranged at either side of the secondary spring suspension device, and the two anti-yaw dampers have the same damping coefficient.

10 Claims, 7 Drawing Sheets

(51) Int. Cl.
| | | |
|---|---|---|
| *B61F 5/52* | (2006.01) | |
| *B61H 7/00* | (2006.01) | |
| *B61K 9/04* | (2006.01) | |
| *B61F 1/14* | (2006.01) | |
| *B61F 3/04* | (2006.01) | |
| *B61F 5/04* | (2006.01) | |
| *B61F 5/30* | (2006.01) | |
| *B61H 5/00* | (2006.01) | |
| *B60T 7/12* | (2006.01) | |
| *B61H 13/36* | (2006.01) | |
| *B61F 5/10* | (2006.01) | |

(52) U.S. Cl.
CPC .............. *B61F 5/04* (2013.01); *B61F 5/10* (2013.01); *B61F 5/24* (2013.01); *B61F 5/30* (2013.01); *B61F 5/52* (2013.01); *B61H 5/00* (2013.01); *B61H 7/00* (2013.01); *B61H 13/36* (2013.01); *B61K 9/04* (2013.01)

(56) References Cited

U.S. PATENT DOCUMENTS

| | | | | |
|---|---|---|---|---|
| 5,090,333 A * | 2/1992 | Bieker | ................... | B61F 5/325 105/167 |
| 5,211,116 A * | 5/1993 | Schneider | ................. | B61F 5/24 105/168 |
| 5,351,624 A * | 10/1994 | Ahlborn | .................... | B61F 5/10 105/185 |
| 6,338,300 B1 * | 1/2002 | Landrot | .................. | B61F 5/305 105/182.1 |
| 6,439,130 B1 * | 8/2002 | Scheffel | .................... | B61F 5/38 105/167 |
| 2004/0149161 A1 * | 8/2004 | Krishnaswami | .......... | B61F 5/38 105/167 |
| 2005/0183625 A1 * | 8/2005 | Goding | ..................... | B61F 3/06 105/182.1 |
| 2012/0318164 A1 * | 12/2012 | Shinmura | ................. | B61F 5/52 105/138 |
| 2013/0019774 A1 * | 1/2013 | Ahuja | ....................... | B61C 9/50 105/133 |
| 2016/0362120 A1 * | 12/2016 | Ma | ............................ | B61F 5/24 |
| 2016/0368512 A1 * | 12/2016 | Wang | ..................... | B61F 5/325 |
| 2017/0096150 A1 * | 4/2017 | Hubmann | ................ | B61F 5/52 |
| 2017/0232979 A1 * | 8/2017 | Zhang | ..................... | B61F 5/52 105/198.1 |

FOREIGN PATENT DOCUMENTS

| | | |
|---|---|---|
| CN | 102233881 A | 11/2011 |
| CN | 202243514 U | 5/2012 |
| CN | 102490755 A | 6/2012 |
| CN | 102753418 A | 10/2012 |
| CN | 102923153 A | 2/2013 |
| CN | 103738347 A | 4/2014 |
| CN | 104325991 A | 2/2015 |
| CN | 104627196 A | 5/2015 |
| CN | 204605835 U | 9/2015 |
| JP | H10250576 A | 9/1998 |
| JP | 2006015820 A | 1/2006 |
| JP | 2007112304 A | 5/2007 |
| JP | 2008201372 A | 9/2008 |
| JP | 2013203321 A | 10/2013 |

* cited by examiner

BOGIE FOR HIGH-SPEED RAILWAY VEHICLE

This application is a National Phase entry of PCT Application No. PCT/CN2015/094559, filed Nov. 13, 2015, which application claims the benefit of priorities to Chinese Patent Application No. 201510061590.3 titled "BOGIE FOR HIGH-SPEED RAILWAY VEHICLE", filed with the Chinese State Intellectual Property Office on Feb. 5, 2015, and Chinese Patent Application No. 201520083974.0 titled "BOGIE FOR HIGH-SPEED RAILWAY VEHICLE", filed with the Chinese State Intellectual Property Office on Feb. 5, 2015, the entire disclosures of which are incorporated herein by reference.

FIELD

The present application relates to the technical field of railway vehicles, and particularly to a bogie of a high-speed railway vehicle which can travel at a speed up to 350 km/h continuously.

BACKGROUND

A bogie is one of main components of a vehicle, which mainly consists of a wheel set, an axle box, a primary spring suspension device, a frame, a secondary spring suspension device, a driving device (provided only in a power bogie), a foundation braking device, etc.

The wheel set is formed by assembling an axle and two wheels integrally, and the wheels and the axle rotate together in the traveling of the vehicle.

The axle box is mounted on a journal at either end of the axle, and is used for coupling the wheel set and the frame together, which converts a rolling of the wheel set on rails into a translation of a vehicle body along a line, transmits action forces from various directions, and ensures excellent lubricating performance and sealing performance.

The primary suspension device is also known as an axle box suspension device, which is mounted between the axle box and the frame of the bogie, including: one spring device, an axle box positioning device, and a vertical damper. The primary suspension device is used for damping vertical impact, restricting movements in longitudinal and lateral directions between the axle box and the frame of the bogie, and transmitting forces in longitudinal and lateral directions.

A frame is a framework of the bogie, which is used for connecting various components of the bogie and transmitting forces in various directions, and is also used for holding the axle in the bogie in place.

The secondary spring suspension device is a connecting device for connecting the vehicle body and the bogie, and thus is also known as a vehicle body supporting device. The secondary spring suspension device generally consists of a spring device (generally an air spring), an anti-rolling device, an anti-yaw damper, a lateral damper, a traction device, etc.

The driving device is used for transmitting power to a driving wheel set from a transmission device, generally including a traction motor, a motor suspension device, and a reduction gear box.

The bogie is used for transmitting various loads, which ensures the generation of a traction force by friction between wheels and rails, and is mainly used for load bearing, force transmission, buffering, and guiding. The structural performance of the bogie directly influences a traction capability, and a running quality of the vehicle, wear and tear of wheels and rails, and safety of the train, which is a key factor in further improving the traveling speed of the train. The higher the train speed is, the higher the requirement imposed on the bogie will be.

Therefore, the bogie technique of the high-speed train becomes one of key techniques of high-speed traveling.

SUMMARY

An object of the present application is to provide a bogie for a high-speed railway vehicle. The bogie has a good dynamic performance, a high structural safety, reliability and economical efficiency, which may meet the requirements of rapid development of high-speed railways.

To achieve the above objects, a bogie for a high-speed railway vehicle is provided according to the present application, which includes a wheel set, an axle box, a primary spring suspension device, a frame, a secondary spring suspension device and a foundation braking device. A wheel of the wheel set has an LMA wheel tread. The foundation braking device is mounted by a three-point hitch structure, and a brake hitching seat of the foundation braking device and a tread cleaning device mount are integrated on the frame into an integral structure. The axle box is a separated structure which allows to be separated in a vertical direction, and a fusible temperature sensor and a real time temperature sensor are mounted at an upper portion of the axle box for monitoring the temperature in the axle box together, and an off-line safety protecting device is mounted at a lower portion of the axle box. A traction rod of the secondary spring suspension device is a single traction rod, and a center pin has an integral hoisting device mounted thereon. Two anti-yaw dampers, as a group, are arranged at either side of the secondary spring suspension device, and the two anti-yaw dampers have the same damping coefficient.

Preferably, the bogie for the high-speed railway vehicle further includes a derailment safety protecting device. The derailment safety protecting device is in an inverted "L" shape, and includes a lateral part and a longitudinal part perpendicular to the lateral part at one side below the lateral part. The lateral part is provided with a mount formed by a wing plate extending outwards at either side in a width direction, and the mount is provided with a bolt hole. An inner side surface of the longitudinal part is a blocking surface.

Preferably, the lateral part is a lateral baffle, and the longitudinal part is a vertical baffle, and the lateral part and the longitudinal part are formed into an integral structure.

Preferably, the thickness of the wing plate is less than the thickness of the lateral part, and a top surface of the wing plate and a top surface of the lateral part are located in the same plane.

Preferably, a lower surface of the lateral part is provided with a concaved portion, the radian of a contact segment of the concaved portion confirms with the radian of a top surface of a rail, and the concaved portion is transited to the blocking surface smoothly via a circular arc-shaped portion at the junction between the lateral part and the longitudinal part.

Preferably, the frame includes side beams and a lateral beam located between the side beams. Each of the side beams is provided with an air spring seat for mounting an air spring. Each of the lateral beams is a hollow seamless steel tube structure. The frame further includes a passage. A main air chamber of the air spring and a cavity of the lateral beam are in communication via the passage.

Preferably, the bogie for the high-speed railway vehicle further includes a longitudinally arranged air chamber. Two ends of the air chamber are respectively in communication with two lateral beams. The passage is in communication with the air chamber for communicating with the cavities of the lateral beams.

Preferably, the two ends of the air chamber are fixed by welding to respective inner side walls of the lateral beam, and the inner side wall of each of the lateral beams is provided with a lateral beam through hole at a position corresponding to an end of the air chamber. The cavity of the lateral beam is in communication with the air chamber via the lateral beam through hole.

Preferably, the air chamber is a curved plate structure having a U-shaped cross section, with an opening of the air chamber being longitudinally welded to an inner side wall of the side beam, and the air chamber connects the side beam and the lateral beams.

Preferably, the inner side wall of the side beam is provided with a side beam through hole at a position corresponding to the opening of the air chamber. The passage is arranged laterally, and has one end in communication with the main air chamber of the air spring, and has another end inserted into the side beam through hole to be in communication with the air chamber.

The bogie for the high-speed railway vehicle with an LMA wheel tread according to the present application is designed and developed based on a project of China standard electric multiple units with a speed of 350 kilometers per hour, which is a light weight bolsterless bogie, with a design strength of axle load of 17 t, employing following structural forms such as an H-type welded frame, rotating-arm type axle box positioning, a single traction rod, disc-type braking, traction motor being suspended, etc. Further, the foundation brake is mounted by a manner of three-point hitch, and a tread cleaning device mount is mounted to be integrated to a brake hitching seat of the frame, and the three-point hitch type foundation brake mount is used in combination with the single traction rod. The axle box is designed to have a separated structure. A fusible temperature sensor and a real-time temperature sensor are mounted at an upper side for monitoring the temperature together, which ensures safety traveling of the vehicle. An off-line safety protecting device is mounted at a lower portion for preventing the vehicle from laterally moving in a large range after the derailment, which ensures the safety of the vehicle and passengers in the vehicle. The tread of the wheel is an LMA type tread, and the primary spring suspension and the secondary spring suspension are designed to have matched rigidities, which allows the bogie of this type to have a good dynamic performance. A center pin has an integral hoisting device mounted thereon, which facilitates the replacement of the wheel set. Furthermore, the lateral beams, and side beams are taken as a technical solution of an additional air chamber of the air spring, which saves the space on the premise that the required function is achieved.

In a preferred solution, through study the principle of the derailment, the derailment prevention technique, an innovative derailment safety protecting device is designed. The structure of the derailment safety protecting device is designed on the premise that the derailment safety protecting device meets function requirements of preventing the vehicle from derailing, and on the condition that the device contacts the rail at a most reasonable portion after the vehicle derails, which allows the derailment safety protecting device to have a smallest adverse effect on the safety of the rail. Further, the profile dimension of the derail safety protecting device is optimized, which meets the strength requirement in preventing the vehicle from derailing. Further, the derailment safety protecting device is mounted under the axle box body by bolt connection, which is located within a rolling stock gauge, and thus has a simple structure, a convenient installation, a small space occupation. The distances of the blocking surface from an outer side surface of the wheel and a rail surface are set safely and reasonably. In a normal state, the blocking surface is not in contact with the rail, and will not interfere with the normal traveling of the vehicle. The blocking surface only contacts the rail after the vehicle derails, which can better restrict the wheel set from continually moving laterally and overturning laterally after the vehicle derails, and effectively restrict the attitude of the vehicle from becoming further worse or overturning after the vehicle derails.

In another preferred solution, the main air chamber of the air spring is in communication with the cavity of the lateral beam, and then the cavity of the lateral beam may function as an additional air chamber of the air spring, thus achieving the communication of the main air chamber of the air spring and the additional air chamber, and effectively utilizing the interior space of the frame, and dispensing with an independent air cylinder mounted for the air spring, and also increasing the volume of the air chamber of the air spring, thereby reducing a natural vibration frequency of the air spring, which allows the air spring to maintain low and nearly equivalent vibration frequencies under any load, and achieves the damping function, and improves the comfort of the railway train. Furthermore, the additional air chamber of the air spring has a better airtightness, which may meet the damping requirements of the railway train under a high speed.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are some examples of the present application, and for those skilled in the art, other drawings may be obtained based on these drawings without any creative efforts.

Reference numerals in the drawings:

| | |
|---|---|
| 1 frame, | 2 axle box, |
| 3 wheel set, | 3-1 wheel, |
| 4 motor, | 5 gear box, |
| 6 foundation braking device, | 7 air spring, |
| 7-1 primary air chamber, | 8 anti-yaw damper, |
| 9 vertical damper, | 10 lateral damper, |
| 11 anti-rolling torsion bar, | 11-1 anti-rolling torsion bar mount, |
| 12 center pin, | 13 tread cleaning device, |
| 14 derailment prevention block, | 14-1 lateral part, |
| 14-2 longitudinal part, | 14-3 wing plate, |
| 14-4 bolt hole, | 14-5 cambered surface, |
| 14-6 blocking surface, | 14-7 concaved portion, |
| 14-8 circular arc-shaped portion, | 15 bolt, |
| 16 rail, | 1-1 side beam, |
| 1-2 lateral beam, | 1-3 air chamber, |
| 1-6 passage, | 1-11 air spring seat, |
| 1-1-1 side beam through hole, | 1-2-1 lateral beam through hole, |
| 41 dovetail structure, | 42 mounting plate, |
| 43 bolt hole. | |

DETAILED DESCRIPTION

For the objects, technical solutions, and advantages of the present application to be clearer, the technical solutions in the embodiments of the present application will be described clearly and completely hereinafter in conjunction with the drawings in the embodiments of the present application. Apparently, the described embodiments are a part of the embodiments of the present application, rather than all embodiments. Based on the embodiments in the present application, all of other embodiments, made by the person skilled in the art without any creative efforts, fall into the scope of the present application.

Terms such as "upper", "lower", "left", and "right" herein are defined based on the positional relationship shown in the drawings, and corresponding positional relationship may also vary depending on different drawings, therefore, these terms should not be understood as absolute definitions to the protection scope.

Figure 1:
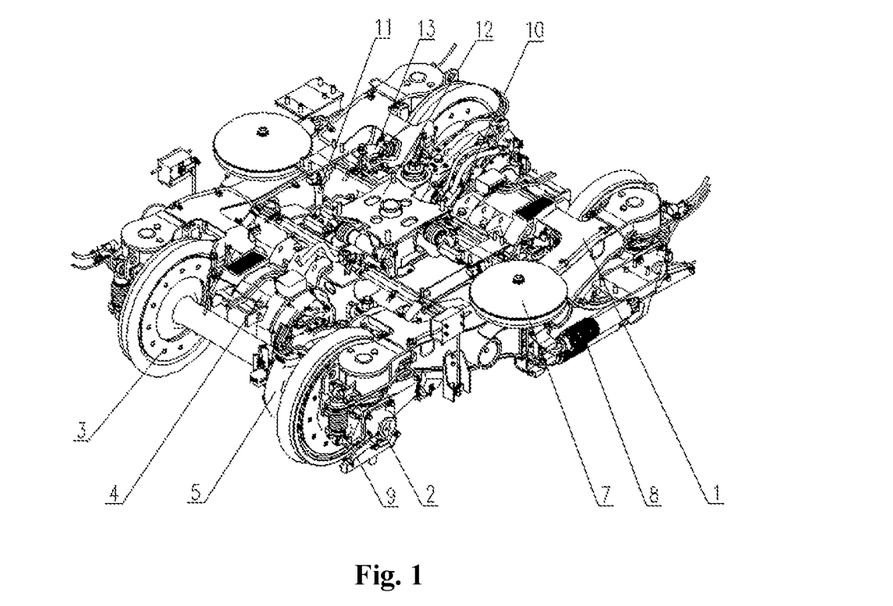
FIG. 1 is a schematic view showing the structure of an embodiment bogie (power bogie) for a high-speed railway vehicle with an LMA wheel tread.

Reference is made to FIG. 1, which is a schematic view showing the structure of an embodiment bogie for a high-speed railway vehicle with an LMA wheel tread according to the present application.

As illustrated in the Figure, the bogie for the high-speed railway vehicle with the LMA wheel tread is a power bogie, which mainly consists of a frame 1, an axle box 2, a wheel set 3, a motor 4, a gear box 5, a foundation braking device 6, an air spring 7, an anti-yaw damper 8, a vertical damper 9, a lateral damper 10, an anti-rolling torsion bar 11, a center pin 12, a tread cleaning device 13, etc.

The bogie for the high-speed railway vehicle with the LMA wheel tread is designed and developed with respect to a project of China standard electric multiple units with a speed of 350 kilometers per hour, which is a light weight bolsterless bogie. The bogie for the high-speed railway vehicle with the LMA wheel tread has a design strength of an axle load of 17 t, and employs following structural forms such as an a H-type welded frame, rotating-arm type axle box positioning, a single traction rod, disc-type braking, traction motor being suspended, etc.

Specifically, the foundation brake is mounted by a manner of three-point hitch, and a tread cleaning device mount is integrated to a brake hitching seat of the frame, and the three-point hitch type foundation brake mount is used in combination with the single traction rod.

The axle box is designed to have a separated structure. A fusible temperature sensor and a real-time temperature sensor are mounted at an upper portion for monitoring the temperature together, which ensures the safety traveling of the vehicle. An off-line safety protecting device is mounted at a lower portion for preventing the vehicle from laterally moving in a large range after derailing and protecting the vehicle and passengers in the vehicle.

An LMA type tread (LMA is a conventional term for representing the tread of this type in the field) is employed for the tread of the wheel. The anti-yaw damper is designed to have equal parameters, that is, two anti-yaw dampers, as a group, are provided at either side, and the two anti-yaw dampers have the same design parameter. And, the primary spring suspension and the secondary spring suspension are designed to have matched rigidities. The frequencies of floating and sinking, nodding, and head shaking of the bogie frame and the frequencies of floating and sinking, nodding, and lateral rolling of vehicle body are determined according to the mass of the bogie, the designed axle load, the rigidity of the primary spring suspension and the rigidity of the secondary spring suspension, so as to ensure that a resonance will not occur between the bogie frame and the vehicle body. To match those parameters, loop optimization is mainly performed by theoretical calculation and emulation analysis, which allows the bogie of this type to have a good dynamic performance.

A center pin has an integral hoisting device mounted thereon. In operation, the separated-type axle box is firstly separated in a vertical direction, and the vehicle body is then hoisted up, and the bogie is hoisted up at a portion where the integral hoisting device mounted on the center pin is in contact with a longitudinal auxiliary beam of the bogie, thus facilitating the replacement of the wheel set.

Furthermore, lateral beams and side beams are taken as a technical solution of an additional air chamber of the air spring, which saves the space while the required function is achieved.

Figure 2:
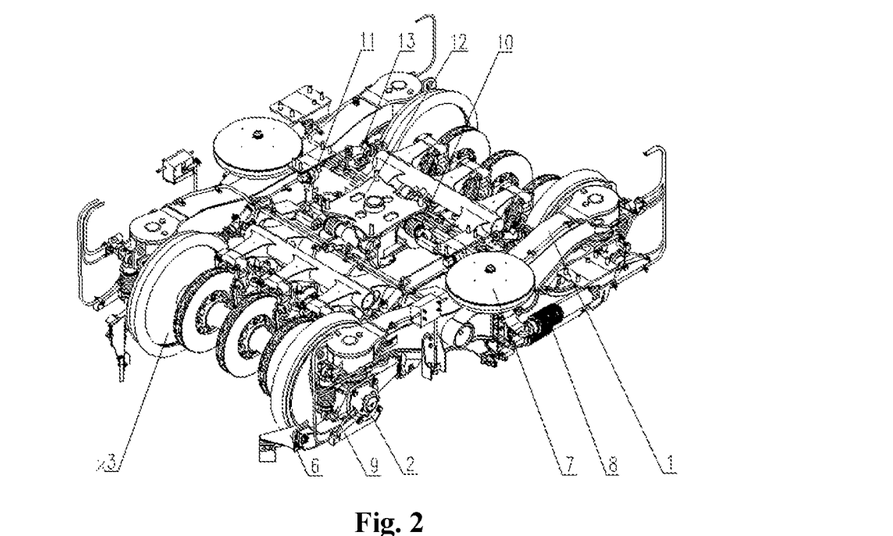
FIG. 2 is a schematic view showing the structure of an embodiment of another bogie (trailer bogie) for the high-speed railway vehicle with the LMA wheel tread.

Reference is made to FIG. 2, which is a schematic view showing the structure of another embodiment bogie for the high-speed railway vehicle with the LMA wheel tread according to the present application.

As illustrated by the Figure, this bogie for the high-speed railway vehicle with the LMA wheel tread is a trailer bogie, which is not provided with a driving motor, a reduction gear box, etc., when compared with the above power bogie. The structure is substantially the same as the above power bogie.

Figure 3:
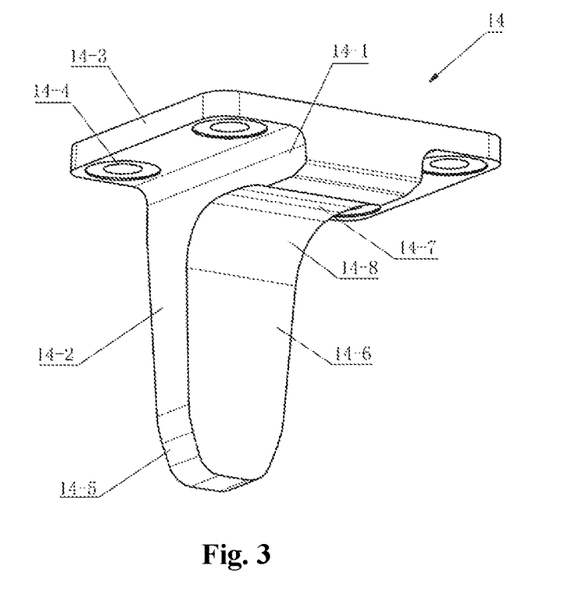
FIG. 3 is a perspective view of a derailment safety protecting device.
Figure 4:
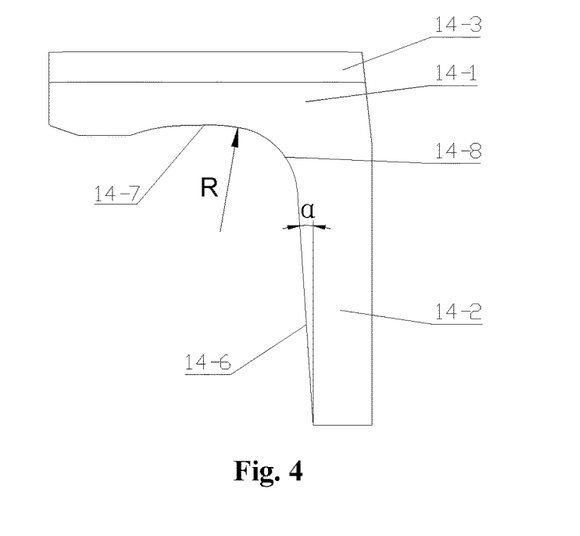
FIG. 4 is a side view of the derailment safety protecting device in FIG. 3.

Referring to FIGS. 3 and 4, FIG. 3 is a perspective view of a derailment safety protecting device, and FIG. 4 is a side view of the derailment safety protecting device in FIG. 3.

The derailment safety protecting device is an inverted "L" shaped derailment prevention block 14, which may consist of a thick lateral part 14-1 and a thick longitudinal part 14-2. The longitudinal part 14-2 is perpendicular to the lateral part 14-1 at one side below the lateral part 14-1, and is in an inverted "L" shape when viewed from a lateral side. Apparently, the term "inverted" used herein is for ease of describing the structure of the derailment prevention block, which is corresponding to the mounting state of the derailment prevention block 14. If the derailment prevention block 14 is turned upside down by 180 degrees, it may then be described as an "L" shape.

Specifically, the lateral part 14-1 is a lateral baffle, and the longitudinal part 14-2 is a vertical baffle. The lateral part 14-1 and the longitudinal part 14-2 are manufactured by one piece of high strength material, and is an integral structure. For example, the lateral part 14-1 and the longitudinal part 14-2 may be manufactured by a material such as steel, iron, alloy, carbon fibers, etc. If the lateral part 14-1 and the longitudinal part 14-2 are manufactured by a metal material, the metal material may be treated by quenching and tempering, which allows the tensile strength and the yield strength to meet higher requirements.

For facilitating the mounting, the lateral part 14-1 is provided with a mount formed by a wing plate 14-3 extending outwards at either side in a traverse direction. The thickness of the wing plate 14-3 is less than the thickness of the lateral part 14-1, and is approximately a half to a quarter of the thickness of the lateral part 14-1. The thickness of the wing plate 14-3 illustrated in the drawing is one third of the thickness of the lateral part 14-1. The top surface of the wing plate 14-3 and the top surface of the lateral part 14-1 are located in a same plane. When viewed from the thickness direction of the longitudinal part 14-2, the derailment prevention block 14 has an overall "T" shape, and when viewed from the top, the whole derailment prevention block 14 has a smooth top surface in a rectangular (or square) shape.

The wing plate 14-3 is provide with two countersink bolt holes 14-4 at a certain interval, and the number of the countersink bolt holes 14-4 is not limited specifically herein. According to different dimensions of the wing plate 14-3 and mounting requirements, the number of the countersink bolt holes may be three, four, or even more, and may also be only provided by one.

An end portion of the longitudinal part 14-2 has a width less than the width of a body part. The end is smoothly transited to side surfaces at two sides by arc surfaces 14-5 (may also be an inclined surface). An inside surface of the longitudinal part 14-2 is a blocking surface 14-6, and the blocking surface 14-6 is inclined inwards by 3 degrees to 5 degrees from the end portion to a root portion in a longitudinal direction. The set inclination angle α herein is 4 degrees, which is the same with an inclination angle β of an inner side surface of a shoulder of the rail.

A lower surface of the lateral part 14-1 is provided with an arc-shaped concaved portion 14-7, whose radius R is 80 mm, confirming with the radian of a top surface of the rail, so as to increase the contact area of the derailment prevention block contacting with a head portion of the rail after the vehicle derails. The concaved portion 14-7 is smoothly transited to the blocking surface 14-6 by a circular arc-shaped portion 14-8 at the junction of the lateral part 14-1 and the longitudinal part 14-2. The circular arc, rather than a right angle, at the junction of the lateral part and the longitudinal part may, in one aspect, eliminate a stress concentration phenomenon, and in another aspect, improve the strength of the derailment prevention block when under stress, which prevents the derailment prevention block from being deformed obviously at the joint when under stress.

As another form, the concaved portion on the lower surface of the lateral part may also be transited to the blocking surface 14-6 of the longitudinal part, and forms, together with the circular arc-shaped portion 14-8 at the junction of the lateral part 14-1 and the longitudinal part 14-2, a cambered portion confirming with the shape of a shoulder at an outer side of the rail.

Figure 5:
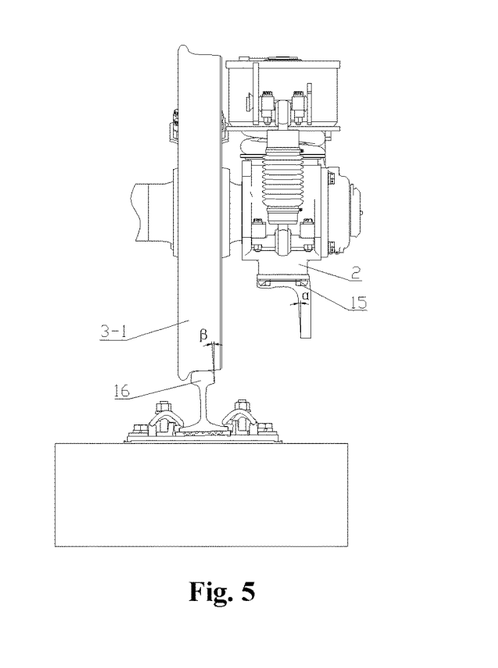
FIG. 5 is a schematic view showing a relative position of the derailment safety protecting device in FIG. 4 in the bogie with respect to an axle box, a wheel and a rail during a normal running state.
Figure 6:
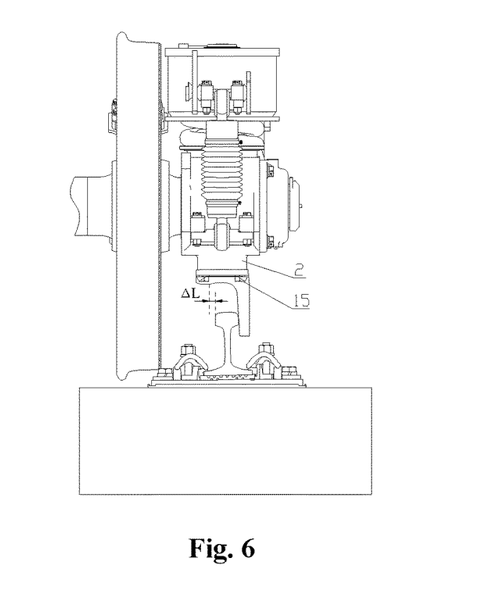
FIG. 6 is a schematic view showing relative positions of the various parts in FIG. 5 with respect to each other when a derailment occurs.

Reference is made to FIGS. 5 and 6, FIG. 5 is a schematic view showing a relative position of the derailment safety protecting device in FIG. 4 in the bogie with respect to the axle box, the wheel and the rail in a normal running state, and FIG. 6 is a schematic view showing relative positions of the various parts in FIG. 5 with respect to each other when derailment occurs.

When in use, the above derailment prevention block is fixed to a lower portion of the axle box 2 by four bolts 15, and each of the two axle boxes of the same wheel set is provided with one derailment prevention block, and the two derailment prevention blocks are respectively corresponding to a left wheel and a right wheel, and are located outside the respective wheels. Since the derailment prevention block keeps a certain distance from the parts such as the wheel 3-1 and a rail 16 in a space, when the vehicle travels normally, the derailment prevention block is not in contact with the wheel and the rail. Only when derailment occurs does the derailment prevention block slidingly contact the inner side surface of the shoulder of the rail.

For example, when the train derails to a left side, the left wheel derails outside the left rail, and a right derailment prevention block located below a right axle box is in contact with a right rail, in this case, the distance between a left derailment prevention block and a left rail increases, which does not participate the derailment prevention, and vice versa.

Since the inclined angles of the blocking surface 14-6 of the derailment prevention block and an outer side surface of the shoulder of the rail 16 are same, the blocking surface 14-6 of the derailment prevention block and an outer side surface of the shoulder of the rail 16 can snugly fit against each other, which, in one aspect, may restrict the vehicle body from continually moving outwards in the lateral direction and restrict the attitude of the vehicle from being further worse or overturned, and, in another aspect, may decelerate the train by a sliding friction in the traveling direction of the train so as to reduce the risk coefficient.

FIG. 5 shows a normal derailment phenomenon, or an initial phase of derailment, in this case, the derailment prevention block performs the position-limiting only by contacting the blocking surface 14-6 with the rail 16.

Figure 7:
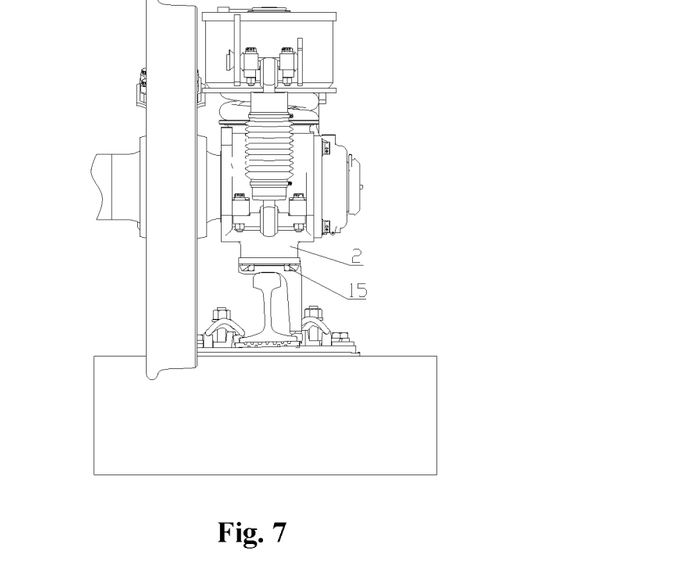
FIG. 7 is a schematic view showing the relative positions of the various parts in FIG. 5 with respect to each other when the derailment further develops.

Reference is made to FIG. 7, which is schematic view showing a relative positions of the various parts in FIG. 3 with respect to each other when the derailment further develops.

When the derailment phenomenon further develops, the wheel 3-1 may continue to sink, in this case, the top surface of the rail 16 may be embedded into the concaved portion 14-7 on the lower surface of the lateral part 14-2 of the derailment prevention block, and the position-limiting is performed by the lateral part 14-1 and the longitudinal part 14-2 together. Specifically, the longitudinal part 14-2 continues to restrict the vehicle body from moving laterally, while the lateral part 14-1 may then restrict the vehicle body from continually moving downward. Further, due to the friction decelerating effect in the running direction, the vehicle can be limited effectively at most in three dimensions, and the radian of the concaved portion 14-7 and the radian of the top surface of the rail 16 confirm with each other, which may avoid damage to the rail.

Furthermore, as illustrated in the FIG. 6, the concaved portion 14-7 of the lateral part 14-1 is not completely aligned with the top surface of the rail 16 vertically, and the concaved portion 14-7 of the lateral part 14-1 are spaced apart by a certain distance ΔL in the lateral direction, and the laterally moved concaved portion 14-7 due to derailment is closer to an inner side, while, the railway is closer to an outer side. Thus, in the process that the derailment develops from the state in the FIG. 6 to the state in the FIG. 7, under the traction effect of the rail 16, the vehicle body may be drawn back outwards, which allow the vehicle body to have a trend of lateral moving reversely, thereby more effectively restricting the lateral movement.

The structure of the derailment safety protecting device is designed on the premise that the derailment safety protecting device meets function requirements of preventing the vehicle from off-line, and on the condition that the device contacts the rail at a most reasonable portion after the vehicle derails, which allows the derailment safety protecting device to have a smallest adverse effect on the safety of the rail. Further, the profile dimension of the derail safety protecting device is optimized, which allows the derailment safety protecting device to meet the strength requirement in preventing the vehicle from off-line. Further, the derailment safety protecting device is mounted under the axle box body by bolt connection, and is located within a rolling stock gauge, which has a simple structure, a convenient installation, a small space occupation. The distances of the blocking surface from an outer side surface of the wheel and a rail surface are set safely and reasonably. In a normal state, the blocking surface is not in contact with the rail, and will not interfere with the normal running of the vehicle, and, the blocking surface only contacts the rail after the vehicle derails, which can better restrict the wheel set from continually moving laterally and overturning laterally after the vehicle derails, and effectively restrict the attitude of the vehicle from becoming further worse or overturning after the vehicle derails.

Figure 8:
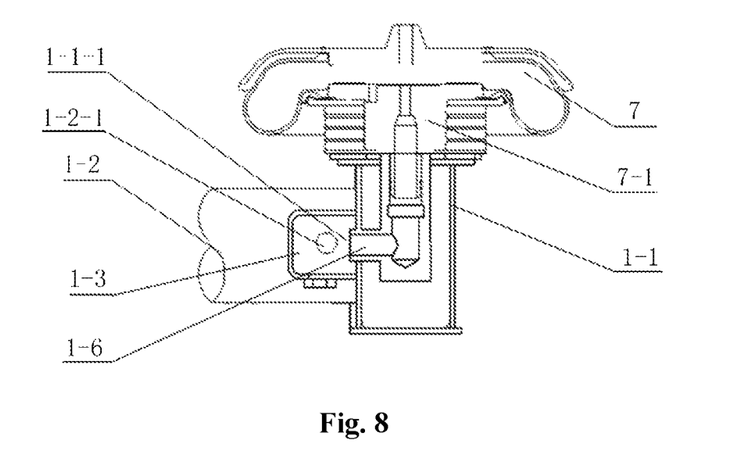
FIG. 8 is a schematic structural view showing an air chamber being communicated in a frame.
Figure 9:
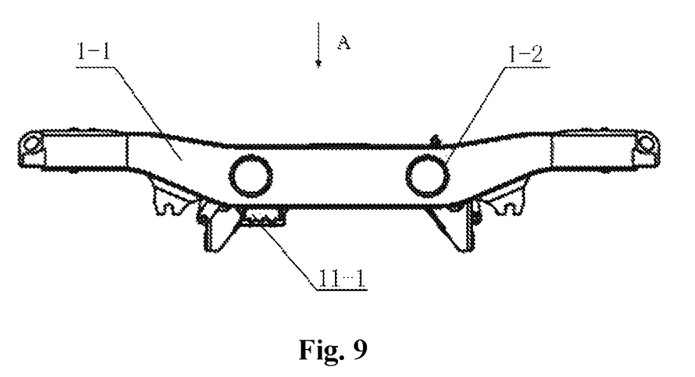
FIG. 9 is a schematic view showing the structure of the frame.
Figure 10:
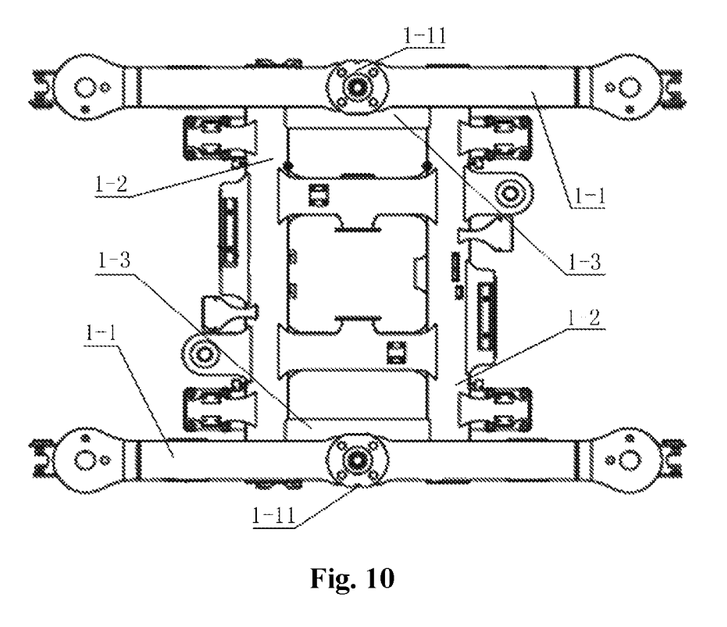
FIG. 10 is a view of FIG. 9 from direction A.

Reference is made to FIGS. 8, 9, and 10. FIG. 8 is a structural schematic view showing an air chamber being communicated in a frame. FIG. 9 is a schematic view showing the structure of the frame. FIG. 10 is a view of FIG. 9 from direction A.

The frame includes two side beams 1-1 and two lateral beams 1-2 located between the side beams 1-1. Each of the side beams 1-1 is provided with an air spring mount 1-11 for mounting the air spring 7. A main air chamber 7-1 of the air spring 7 is located in an inner cavity of the side beam 1-1 after the air spring 7 is mounted, and each of the lateral beams 1-2 is a hollow seamless steel tube structure. In addition, as shown in FIG. 8, the frame further includes a passage 1-6 for communicating the main air chamber 7-1 of the air spring 7 and a cavity of the lateral beam 1-2.

As shown in the FIG. 8, the main air chamber 7-1 of the air spring 7 is in communication with the cavity of the lateral beam 1-2 through the passage 1-6, and then the cavity of the lateral beam 1-2 may function as an additional air chamber of the air spring 7, achieving the communication of the main air chamber 7-1 of the air spring 7 and the additional air chamber, and effectively utilizing the inner space of the frame, and dispensing with an independent air cylinder mounted for the air spring 7, and also increasing the volume of the air chamber of the air spring 7, thereby reducing a natural vibration frequency of the air spring 7, which allows the air spring 7 to maintain low and nearly equivalent vibration frequencies under any load, achieves the damping function, and improves the comfort of the train.

Particularly importantly, it is discovered in an experiment that under a high-speed traveling condition, the reason for declining of damping vibration capacity of an air spring in a conventional technology is that the airtightness of the side beam as an additional air chamber is inferior. Since the side beam is formed by splicing and welding steel plates, multiple welding seams are presented at the circumference of the side beam and the airtightness is inferior. In the present application, improvements are just made on this basis, and a cavity of each of the lateral beams 1-2 having a hollow seamless steel tube structure is taken as an additional air chamber of the air spring 7, and the seamless steel tube has no seam in the circumference and has a superior airtightness. Therefore, compared with the conventional technology, the additional air chamber of the air spring 7 according to the present application has a better airtightness, which may meet the damping requirement of train when at a high speed. Furthermore, the seamless steel tube may have an annular cross section, and may be uniformly stressed when receiving an internal or external radial pressure, which further meets the load bearing requirement of the train at a high speed.

The frame may further include a longitudinally arranged air chamber 1-3, and two ends of the air chamber 1-3 are respectively in communication with two lateral beams 1-2. In addition, the air chamber 1-3 and the main air chamber 7-1 of the air spring 7 are in communication with each other via the passage 1-6, which achieves the communication of the main air chamber 7-1 of the air spring 7 and the cavities of the lateral beams 1-2.

The air chamber 1-3 is hollow inside, and the passage 1-6 and the lateral beams 1-2 are communicated conveniently via the cavity inside the air chamber 1-3, which thus allows the main air chamber 7-1 of the air spring 7 to be in communication with the additional air chamber. In one aspect, the air chamber 1-3 may function as an additional air chamber together with the cavities of the lateral beams 1-2, which further increases the volume of the additional air chamber of the air spring, and improves the damping function of the air spring 7, and, in another aspect, the longitudinally arranged air chamber 1-3 (as illustrated in FIG. 10) may improve the torsional rigidity at the joint of the side beam 1-1 and the lateral beam 1-2, thereby improving the strength and rigidity of the frame.

Further, as shown in FIG. 10, the two ends of the air chamber may be respectively fixed by welding to inner side walls of corresponding lateral beams 1-2. Also, as shown in FIG. 8, the inner side wall of each of the lateral beams 1-2 is provided with a lateral beam through hole 1-2-1 at a position corresponding to an end of the air chamber 1-3, and through the lateral beam through hole 1-2-1, the cavities of the lateral beams 1-2 are in communication with the air chamber 1-3.

In this embodiment, the air chamber 1-3 is fixed to the inner side walls of the lateral beams 1-2 by welding, and the connection method is relatively simple, the obtained tightness is excellent, and other connection structure may be dispensed, thus achieving a light weight of the frame. Therefore, the connecting method for connecting the air chamber 1-3 and the inner side walls of the lateral beams 1-2 is preferably welding. However, it may be appreciated by those skilled in the art that, theoretically, the connecting method for connecting the two ends of the air chamber 1-3 and the inner side walls of the two lateral beams 1-2 is not limited to welding, for example, the two ends of the air chamber 1-3 may be inserted into the inner cavities of the lateral beams 1-2 respectively, and sealing at the portions where the air chamber 1-3 is connected to the lateral beams 1-2 may also be feasible, or designing corresponding connecting buckles may also be feasible.

Based on this, the air chamber 1-3 may be a curved plate structure having a U shaped cross section, with an opening of the U shaped cross section of the air chamber 1-3 being longitudinally welded to an inner side wall of one of the side beams 1-1, which allows the side beam 1-1 to be connected to the lateral beams 1-2 via the air chamber 1-3. Reference is made to FIGS. 8 and 10, two edges at the opening of the U-shaped curved plate are welded to the lateral beams 1-2, and the passage 1-6 corresponds to the position at the opening of the U-shaped curved plate, so as to be in communication with the air chamber 1-3.

In this embodiment, the air chamber 1-3 is a U-shaped curved plate structure, and cooperates with the inner side wall of the side beam 1-1 to form a required cavity, which in one aspect, utilizes the inner side wall of the side beam 1-1, which may save the material for forming the air chamber 1-3 and achieve weight reduction of the frame, more importantly, fixing of the side beam 1-1 and the lateral beams 1-2 by welding is achieved, which allows the side beam 1-1 and the lateral beams 1-2 to be fixed without being directly welded to each other. In the case that the side beam 1-1 and the lateral beams 1-2 are welded directly, the welding seam formed by welding is hard to be visually inspected due to the mounting structure and the space restriction, and the welding is hard to be implemented, and the airtightness detection are hard to be performed, while the welding position of the air chamber 1-3 is not covered, and the welding seam is easily to be inspected, thus facilitating the welding implementation and the airtightness detection.

It is to be noted that, since the main function of the air chamber 1-3 is to communicate the passage 1-6 and the cavities of the lateral beams 1-2. Thus, the air chamber 1-3 may be actually a structure as long as it has an inner cavity. For example, the cross section of the air chamber 1-3 may be a triangular shape or other shapes, or the air chamber 1-3 may also be an integral cavity structure which is directly formed by welded steel plates. However, compared with the triangular-shaped cross section, the U-shaped cross section has a large bending resistance coefficient, and a small stress, and a high strength, while the integral cavity structure formed directly by the welded steel plates presents multiple welding seams, which has an inferior airtightness. The curved plate structure having the U-shaped cross section is an integral structure, which has an excellent airtightness, and a large torsional rigidity, and a simple structure. Therefore, the air chamber 1-3 according to the present application is preferably the curved plate structure having the U-shaped cross section.

It may be appreciated that, for achieving the communication of the passage 1-6 and the air chamber 1-3, the inner side wall of the side beam 1-1 is required to be provided with a side beam through hole 1-1-1 at a position corresponding to the opening of the air chamber 1-3. In this case, the passage 1-6 may be arranged laterally, and has one end in communication with the main air chamber 7-1 of the air spring 7, and has another end inserted into the side beam through hole 1-1-1 to be in communication with the air chamber 1-3.

In the above embodiment, the passage 1-6 is in communication with the cavities of the lateral beams 1-2 via the longitudinally arranged air chamber 1-3, and the longitudinally arranged air chamber 1-3 not only achieves the communication between the passage 1-6 and the cavities of the lateral beams 1-2, but also improves the torsional rigidity of the frame. It may be appreciated that, the communication manner of the passage 1-6 and the cavity of the lateral beam 1-2 is not limited to this. For example, the frame may include two curved tubes, and each of the two curved tubes have one end in communication with the passage 1-6, and have another end in communication with the cavities of the respective two lateral beams 1-2. This structure may also achieve the communication of the passage 1-6 and the cavities of the lateral beams 1-2. However, since the structure includes two separately arranged curved tubes, compared with the air chamber 1-3 of the integral structure, the structure has both inferior strength and inferior rigidity, therefore, the passage 1-6 and the cavities of the lateral beams 1-2 are in communication preferably via the air chamber 1-3.

In view of the above embodiments, further improvements may be made.

Figure 11:
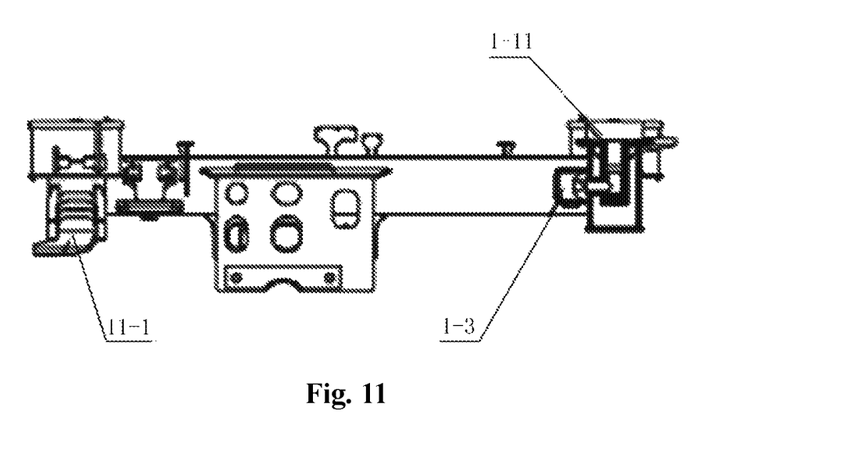
FIG. 11 is a partial side sectional view of FIG. 9.
Figure 12:
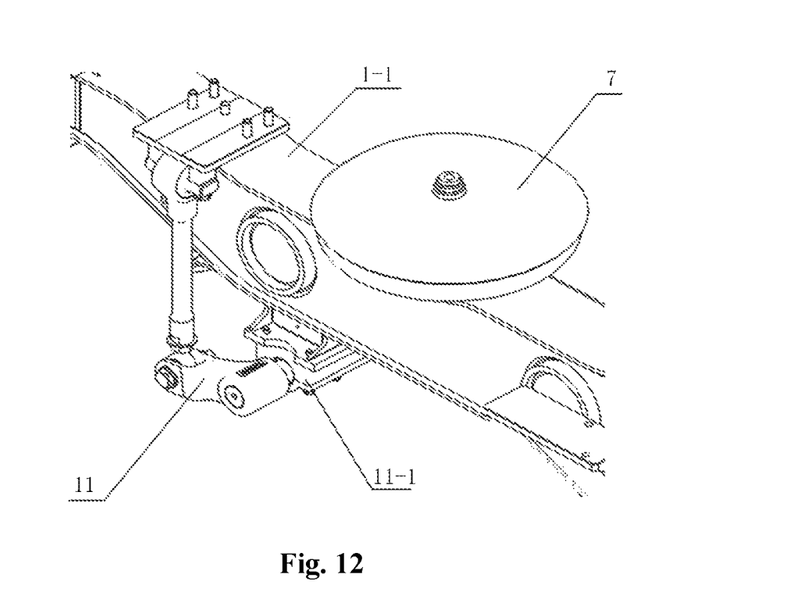
FIG. 12 is a schematic view showing the mounting of an anti-rolling torsion bar to an anti-rolling torsion bar mount.
Figure 13:
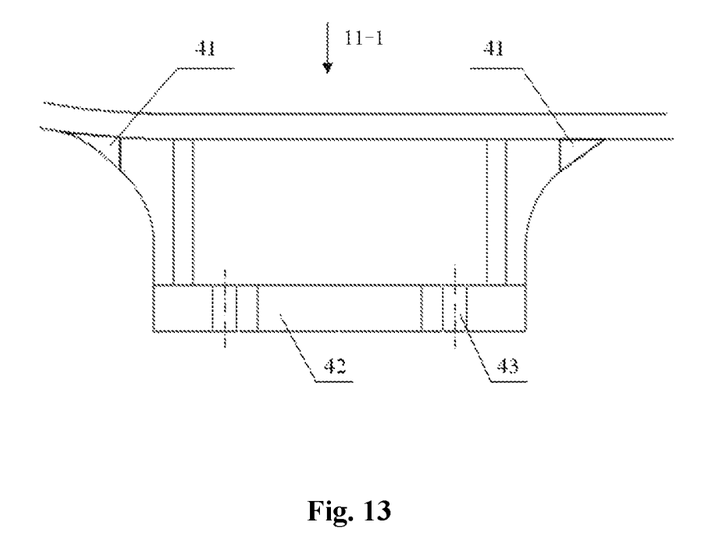
FIG. 13 is a schematic view showing the anti-rolling torsion bar mount in FIG. 12.

Please continue to refer to FIGS. 11, 12, and 13. FIG. 11 is a side sectional view of partial of FIG. 9. FIG. 12 is a schematic view showing mounting of an anti-rolling torsion bar and an anti-rolling torsion bar mount. FIG. 13 is a schematic view showing the anti-rolling torsion bar in FIG. 12.

An anti-rolling torsion bar mount 11-1 for mounting the anti-rolling torsion bar 11 may be welded at a lower side of the side beam 1-1, and the anti-rolling torsion bar mount 11-1 is transited to a bottom of the side beam 1-1 by a round corner, and form a dovetail structure 41.

The anti-rolling torsion bar mount 11-1 is welded to the lower side of the side beam 11-1. In this case, the anti-rolling torsion bar 11 is located at an outer side of the side beam 11-1, which, compared with the anti-rolling torsion bar 11 being arranged at an inner side of the side beam 1-1, has a large lateral span between the anti-rolling torsion bars 11 at two sides, and has a small shaking of the vehicle body under the same reverse torque condition, and has a better effect on improving the comfort of the train and the function of anti-rolling.

In addition, the air chamber 1-3 is provided at the inner side of the side beam 1-1 in the above embodiment, and mounting the anti-rolling torsion bar 11 at the outer side of the side beam 1-1 may avoid the interference with the air chamber 1-3. On the whole, the anti-rolling torsion bar device has a compact arrangement, and occupies a smallest space in the lateral direction. However, it may be appreciated that, the anti-rolling torsion bar mount 11-1 is not limited to be mounted at the lower side of the side beam 1-1, and it may also be mounted to a lower side of the lateral beam 1-2, and in this case, the anti-rolling torsion bar 11 is just located at an inner side of the side beam 1-1 of the frame.

Also, as shown in FIG. 13, the anti-rolling torsion bar mount 11-1 is transited to the bottom of the side beam 1-1 by a round corner, forming the dovetail structure 41, which may effectively relieve the stress concentration at the joint between the side beam 1-1 and the anti-rolling torsion bar mount 11-1, thereby improving the strength of the frame. In addition, the method for connecting the side beam 1-1 and the anti-rolling torsion bar mount 11-1 is not limited to welding. The reason is described in the above description, which is not repeated here.

Specifically, the anti-rolling torsional seat 11-1 may be formed by welding steel plates into a structure in which a top is provided with an opening and a bottom is a mounting plate 42. The mounting plate 42 is used for mounting the anti-rolling torsion bar 11, and the top of the anti-rolling torsion bar mount 11-1 and the side beam 1-1 may constitute a box-shaped structure by welding.

The top of the anti-rolling torsion bar mount 11-1 and the bottom wall of the side beam 1-1 form a box-shaped structure by welding, which ensures an enough structure strength and rigidity, furthermore, the box-shaped structure provides a mounting space for the anti-rolling torsion bar 11 inside.

Further, the mounting plate 42 at the bottom of the anti-rolling torsion bar mount 11-1 may be formed by pressing a steel plate, and is provided with a threaded hole 43 for mounting the anti-rolling torsion bar 11.

The mounting plate 42 at the bottom of the anti-rolling torsion bar mount 11-1 is formed by pressing the steel plate, and a profiled steel plate formed by pressing has advantages such as a light weight a high strength, etc. It may be appreciated that, the method for forming the mounting plate 42 is not limited to the steel plate pressing, which may also be formed by other methods such as forging, however, compared with pressing, the steel plate formed by forging has a low strength. Therefore, the mounting plate 42 in this embodiment is preferably formed by steel plate pressing.

In summary, the frame employs an integral structure which is connected by welding, which, on the premise of achieving stability and strength of the connection, may effectively simplify the connection structure between various beams, and achieve weight reduction. In addition, the air chamber 1-3 is welded between the side beam 1-1 and the lateral beams 1-2, and the air chamber 1-3 and the cavities of the lateral beam 1-2 are used as additional air chamber of the air spring 7. The overall structure is simple, mounting the anti-rolling torsion bar 11 at the lower side of the side beam 1-1 may be facilitated, and on the premise of achieving the damping and the strength, the anti-rolling rigidity of the vehicle may be improved, and further the requirements for the railway train at a high speed may be met.

The bogie for the high-speed railway vehicle with an LMA wheel tread according to the present application is described in detail hereinbefore. The principle and the embodiments of the present application are illustrated herein by specific examples. The description of the above embodiments is only intended to facilitate the understanding of the concept of the present application. It should be noted that, for those skilled in the art, many modifications and improvements may be made to the present application without departing from the principle of the present application, and these modifications and improvements are also deemed to fall into the protection scope of the present application defined by the claims.

What is claimed is:

1. A bogie for a high-speed railway vehicle, comprising a wheel set, an axle box, a primary spring suspension device, a frame, a secondary spring suspension device, and a foundation braking device,
    wherein a wheel of the wheel set has an LMA wheel tread,
    the foundation braking device is mounted by a three-point hitch structure,
    a brake hitching seat of the foundation braking device and a tread cleaning device mount are integrated on the frame into an integral structure,
    the axle box is a structure which is separatable in a vertical direction, and a fusible temperature sensor and a real time temperature sensor are mounted at an upper portion of the axle box for monitoring the temperature in the axle box together,
    an off-line safety protecting device is mounted at a lower portion of the axle box,
    a traction rod of the secondary spring suspension device is a single traction rod, and a center pin is provided and an integral hoisting device is mounted on the center pin, and
    two anti-yaw dampers, as a group, are arranged at either side of the secondary spring suspension device, and the two anti-yaw dampers have the same damping coefficient.

2. The bogie for the high-speed railway vehicle according to claim 1, further comprising a derailment safety protecting device, wherein the derailment safety protecting device is in an inverted "L" shape, and comprises a lateral part and a longitudinal part perpendicular to the lateral part at one side below the lateral part,
    the lateral part is provided with a mount formed by a wing plate extending outwards at either side in a width direction, the mount is provided with a bolt hole, and an inner side surface of the longitudinal part is a blocking surface.

3. The bogie for the high-speed railway vehicle according to claim 2, wherein the lateral part is a lateral baffle, and the longitudinal part is a vertical baffle, and the lateral part and the longitudinal part are formed into an integral structure.

4. The bogie for the high-speed railway vehicle according to claim 3, wherein the thickness of the wing plate is less than the thickness of the lateral part, and a top surface of the wing plate and a top surface of the lateral part are located in the same plane.

5. The bogie for the high-speed railway vehicle according to claim 4, wherein a lower surface of the lateral part is provided with a concaved portion, the radian of a contact segment of the concaved portion confirms with the radian of a top surface of a rail, and the concaved portion is transited to the blocking surface smoothly via a circular arc-shaped portion at the junction between the lateral part and the longitudinal part.

6. The bogie for the high-speed railway vehicle according to claim 1, wherein the frame comprises side beams and lateral beams located between the side beams, each of the side beams is provided with an air spring seat for mounting an air spring, each of the lateral beams is a hollow seamless steel tube structure, and the frame further comprises a passage, and a main air chamber of the air spring and a cavity of the lateral beam are in communication via the passage.

7. The bogie for the high-speed railway vehicle according to claim 6, further comprising an air chamber which is longitudinally arranged, wherein two ends of the air chamber are respectively in communication with the two lateral beams, and the passage is in communication with the air chamber to achieve the communication with the cavities of the lateral beams.

8. The bogie for the high-speed railway vehicle according to claim 7, wherein the two ends of the air chamber are fixed by welding to inner side walls of corresponding lateral beams, and the inner side wall of each of the lateral beams is provided with a lateral beam through hole at a position corresponding to an end of the air chamber, the cavity of the lateral beam is in communication with the air chamber via the lateral beam through hole.

9. The bogie for the high-speed railway vehicle according to claim 7, wherein the air chamber is a curved plate structure having an U-shaped cross section, with an opening of the air chamber being longitudinally welded to an inner side wall of the side beam, and the air chamber connects the side beam and the lateral beams.

10. The bogie for the high-speed railway vehicle according to claim 9, wherein the inner side wall of the side beam is provided with a side beam through hole at a position corresponding to the opening of the air chamber, the passage is arranged laterally, and has one end in communication with the main air chamber of the air spring, and has another end inserted into the side beam through hole to be in communication with the air chamber.

* * * * *